United States Patent
Atterbury et al.

(10) Patent No.: US 6,722,113 B2
(45) Date of Patent: Apr. 20, 2004

(54) REMOVABLE COUNTERWEIGHTS FOR OUTDOOR POWER EQUIPMENT UNIT

(75) Inventors: C. Mark Atterbury, Lincoln, NE (US); John C. Crumrine, Beatrice, NE (US)

(73) Assignee: Exmark Mfg. Co., Inc., Beatrice, NE (US)

( * ) Notice: Subject to any disclaimer, the term of this patent is extended or adjusted under 35 U.S.C. 154(b) by 0 days.

(21) Appl. No.: 09/904,437

(22) Filed: Jul. 12, 2001

(65) Prior Publication Data

US 2003/0010008 A1 Jan. 16, 2003

(51) Int. Cl.⁷ .......................... A01D 34/64; A01B 73/00
(52) U.S. Cl. .......................... 56/16.7; 56/228
(58) Field of Search .......................... 56/16.7, 322, 228, 56/14.7; D15/28; 301/53.5, 61; 172/611

(56) References Cited

U.S. PATENT DOCUMENTS

| | | | | |
|---|---|---|---|---|
| 1,130,732 A | * | 3/1915 | Hirshheimer | 172/536 |
| 2,699,362 A | * | 1/1955 | Sawyer et al. | 301/53.5 |
| 4,067,415 A | * | 1/1978 | Samide | 187/222 |
| 4,580,811 A | * | 4/1986 | Wykhuis et al. | 280/759 |
| 4,622,806 A | * | 11/1986 | Bahnman et al. | 56/15.5 |
| 4,807,904 A | * | 2/1989 | Kamlukin et al. | 180/311 |
| 5,116,106 A | * | 5/1992 | Hardesty et al. | 301/53.5 |
| 5,135,078 A | * | 8/1992 | Bell et al. | 182/142 |
| 5,255,931 A | * | 10/1993 | Hurlburt | 180/266 |
| 6,003,401 A | * | 12/1999 | Smith | 180/6.48 |

OTHER PUBLICATIONS

Walker Tail Weight Kit Parts Illustration dated Mar. 29, 2000.
Walker Catalog, pp. 2, 3 and 6 dated Jun. 2001.

* cited by examiner

*Primary Examiner*—Thomas B. Will
*Assistant Examiner*—Alicia Torres
(74) *Attorney, Agent, or Firm*—James W. Miller

(57) ABSTRACT

An outdoor power equipment unit, such as a lawn mower, is supported for rolling over the ground by a plurality of ground engaging wheels, including a pair of front caster wheels. A ground or turf grooming or working implement, such as a cutting deck, is supported on the outdoor power equipment unit. Removable counterweights can be dropped down or lifted off the tops of the caster wheels. This places the counterweights as far forwardly as possible which is useful when balancing the weight of a rear mounted accessory. In addition, the counterweights can be installed and removed without using a mounting bar or other mounting hardware on the outdoor power equipment unit.

14 Claims, 6 Drawing Sheets

REMOVABLE COUNTERWEIGHTS FOR OUTDOOR POWER EQUIPMENT UNIT

TECHNICAL FIELD

This invention relates to an outdoor power equipment unit, such as a lawn mower, having a plurality of ground engaging wheels which include a pair of caster wheels. More particularly, this invention relates to counterweights that may be removably attached to the mower over the caster wheels.

BACKGROUND OF THE INVENTION

Lawn mowers are known which have a traction frame that carries an engine or other power source and is movable over the ground by virtue of various ground engaging wheels. In some cases, the traction frame is part of a vehicle on which the operator rides during a mowing operation. In this case, the traction frame includes a seat for the operator along with various controls the operator uses to guide and control the movement of the traction frame.

A cutting deck houses one or more rotary blades. The cutting deck is suspended from the traction frame for mowing grass during operation of the mower. The cutting deck suspension allows the cutting deck to float relative to the traction frame to better follow the contours of the ground.

The wheels which support the traction frame often include a pair of drive wheels and a pair of caster wheels. The drive wheels are driven by a traction system that is powered by the engine to allow the mower to propel itself over the ground. The traction frame is steered by differentiating the speed of the drive wheels. The caster wheels are not driven or steered, but are able to rotate about vertical axes during operation of the mower. The caster wheels are often mounted on the forwardmost ends of front outriggers on the traction frame such that the caster wheels are the forwardmost components of the mower.

In some cases, a grass catcher is desirably mounted on the mower to collect grass clippings generated by operation of the cutting deck. The cutting deck is fitted with a fan or blower. A duct leads between the fan or blower and a grass catching assembly at the rear of the mower. The fan or blower generates an air stream that is sufficient to entrain the grass clippings and propel such clippings through the duct into one or more grass collecting bags or hoppers in the grass catching assembly. The bags or hoppers are normally hung beneath a grass distributing hood that receives the grass clippings from the duct and causes the grass clippings to fall out into the bags or hoppers.

Mounting a grass catching assembly on the rear of the mower adds significant weight to the mower rearwardly of the drive wheels. First, there is the weight of the grass catching assembly itself, including the weight of the grass collecting bags or hoppers and the grass distributing hood. Secondly, as the mower operates and as the grass clippings are distributed into the bags or hoppers, the weight of the grass clippings becomes an important factor. This is particularly true when the grass being cut is wet or damp such that the grass clippings themselves are somewhat wet or damp. As the bags or hoppers become full of clippings, the weight added to the grass catching assembly by the grass clippings can easily equal the weight of the structural components of the grass catching assembly.

The weight added to the mower in a rear mounted accessory, such as the grass catching assembly described above, can disturb the balance of the mower. This in turn affects the operational characteristics of the mower, particularly when ascending hills.

To keep the balance of the mower approximately the same as when no accessory is added to the rear of the mower, it is conventional to add counterweights to the front of the mower to counterbalance the weight added by the rear mounted accessory. Traditionally, such counterweights comprise a number of weights that are removably hung from a mounting bar that is bolted to some forward portion of the traction frame. While the weights can be installed or removed from the mounting bar by lifting them on and off the mounting bar, the mounting bar itself is usually permanently left in place on the mower.

The counterweight system used in the prior art has various disadvantages. For one thing, the mounting bar is itself relatively expensive and complex to manufacture. In addition, the mounting bar cannot be bolted to the very front of the traction frame as that is the spot usually occupied by the caster wheels, which must be free to rotate about their horizontal axes of rotation and swivel about their vertical support axes. Finally, even when the counterweights are removed from the mounting bar when the rear mounted accessory is removed, the mounting bar itself is normally left in place. Thus, the weight of the mounting bar per se will also affect the balance of the mower if no rear mounted accessory is in place, this time shifting the balance forwardly instead of rearwardly.

SUMMARY OF THE INVENTION

One aspect of this invention is to provide a removable counterweight for an outdoor power equipment unit. The counterweight is configured to be installed and removed from the outdoor power equipment unit without using a weight mounting bar on the outdoor power equipment unit.

Another aspect of this invention relates to a removable counterweight for an outdoor power equipment unit having at least one caster wheel which pivots about a generally vertically extending caster hub. The counterweight is located on top of the caster wheel when in use.

Yet another aspect relates to a removable counterweight for an outdoor power equipment unit. The counterweight has a channel sized to fit over a structural frame member of the outdoor power equipment unit such that the counterweight can be dropped down onto and lifted off of the structural frame member. A lock is provided on the counterweight for securing the counterweight to the structural frame member.

Another aspect of this invention relates to an outdoor power equipment unit. The outdoor power equipment unit comprises a traction frame supported for movement over the ground by a plurality of ground engaging wheels including a pair of front caster wheels. An implement is carried on the traction frame for performing a ground or turf grooming or working operation. A pair of counterweights is located on the traction frame with each counterweight being located on top of one of the front caster wheels.

BRIEF DESCRIPTION OF THE DRAWINGS

This invention will be described hereafter in the following Detailed Description, taken in conjunction with the following drawings, in which like reference numerals refer to like elements or parts throughout.

DETAILED DESCRIPTION

Figure 1:
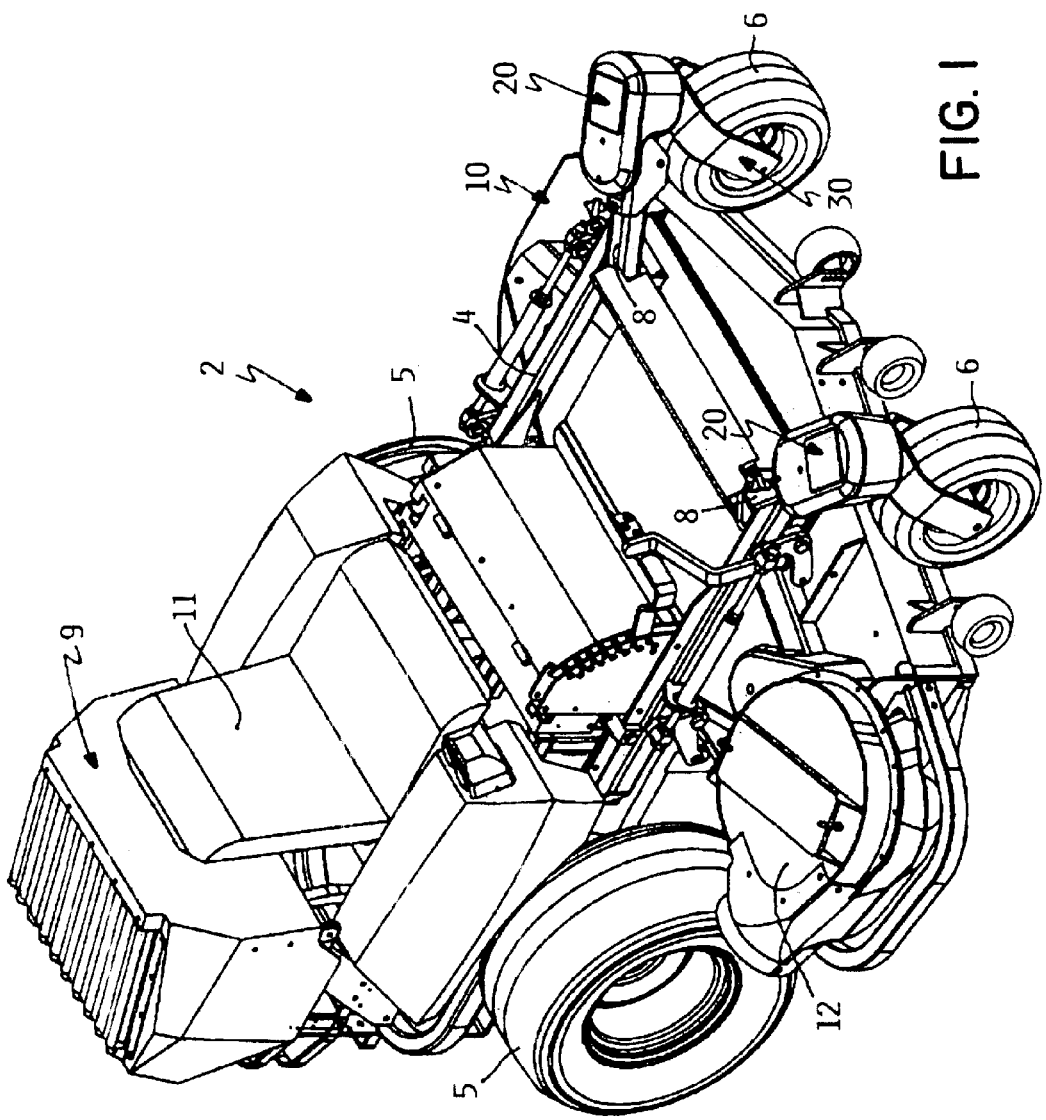
FIG. 1 is a perspective view of an outdoor power equipment unit having a pair of caster wheels, particularly illustrating a pair of removable counterweights according to this invention installed over the caster wheels.
Figure 2:
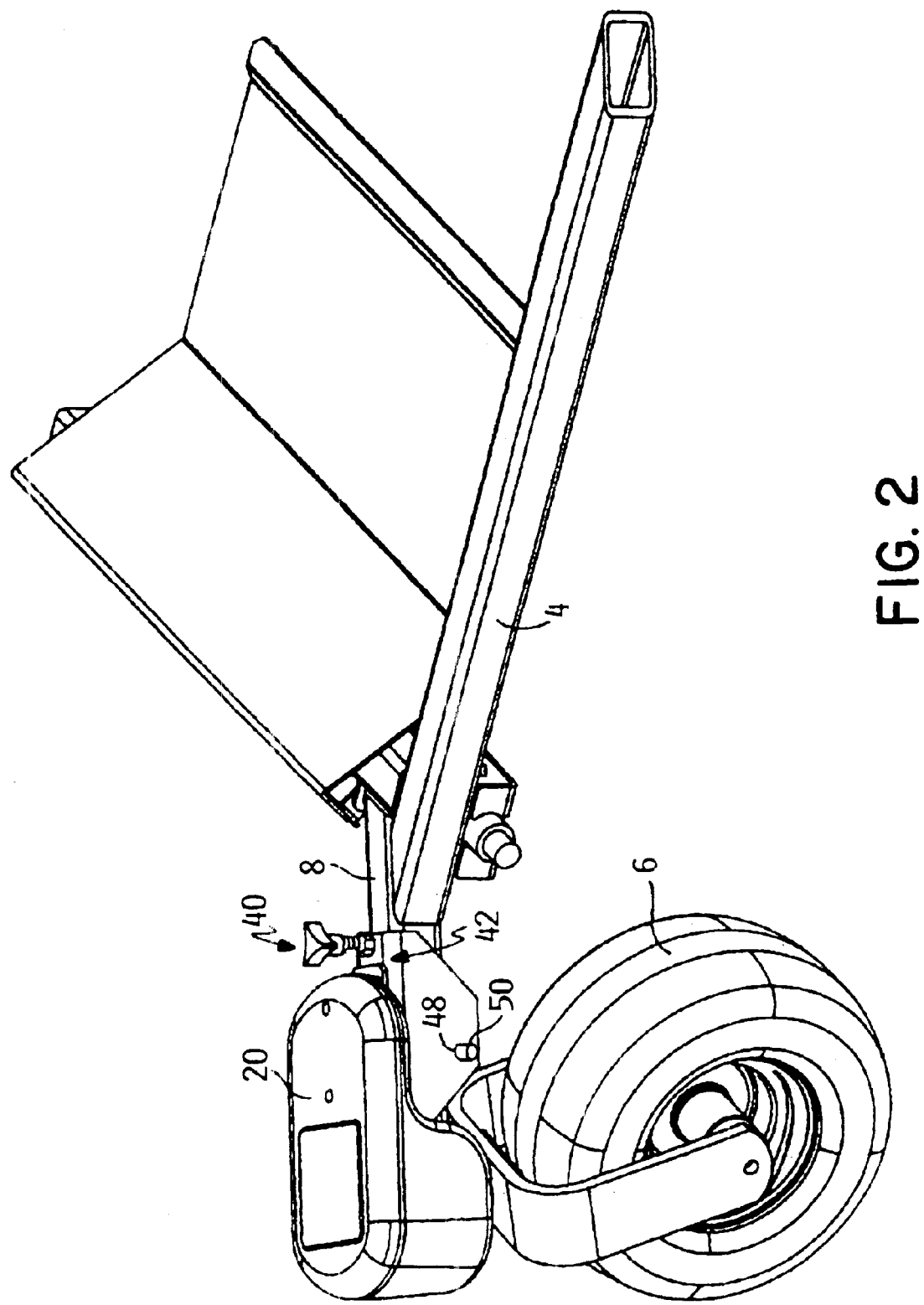
FIG. 2 is an enlarged perspective view of one of the counterweights of FIG. 1 installed over a caster wheel with the counterweight shown clamped to the front outrigger supporting the caster wheel.

FIG. 1 illustrates one type of outdoor power equipment unit, namely a portion of a lawn mower 2 of the type known as a rotary mower. Mower 2 includes a chassis or traction frame 4 that is movably supported for rolling over the ground by various ground engaging wheels. Such wheels include a pair of drive wheels 5 and a pair of caster wheels 6. Caster wheels 6 are mounted on front outriggers 8 that form part of traction frame 4. Front outriggers 8 extend forwardly such that caster wheels 6 are the forwardmost components of mower 2.

A rotary cutting deck 10 is suspended beneath the traction frame 4. Mower 2 includes a rear mounted engine 9 and an operator's seat 11 for carrying the operator of mower 2. Cutting deck 10 includes a fan or blower 12 that blows grass clippings generated by cutting deck 10 through a duct (not shown) to a grass catching assembly (not shown) on the rear of mower 2. A mower 2 of the type shown herein, i.e. a mower 2 with a traction frame 4 that forms a riding vehicle supported by a pair of drive wheels 5 and a pair of caster wheels 6, with a rotary cutting deck 10, and with a grass catching assembly at the rear of mower 2 receiving clippings through a duct from a deck mounted fan or blower 12, is well known in the mower art and need not be further described herein.

This invention relates to removable counterweights 20 for balancing the weight of a rear mounted accessory, such as a rear mounted grass catching assembly. Two counterweights are provided. Each counterweight 20 is removably attached to mower 2 over one caster wheel 6.

Figure 6:
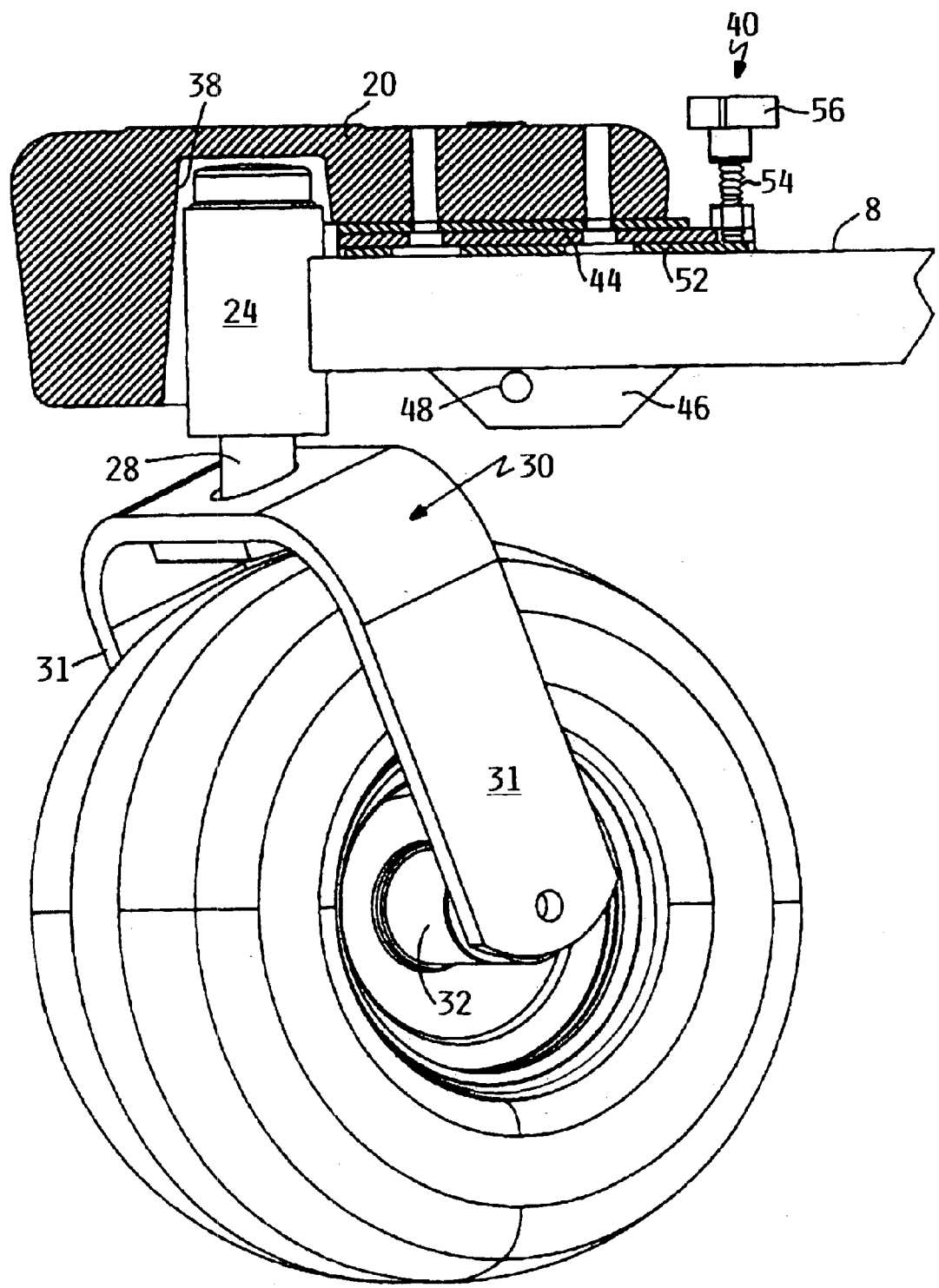
FIG. 6 is a cross-sectional view of one of the counterweights of FIG. 1 installed over a caster wheel on the front outrigger supporting the caster wheel.

As shown in FIG. 6, a caster hub 24 extends vertically on the forward end of front outrigger 8. Caster hub 24 rotatably journals the vertical pivot stem 28 of a support yoke 30 that carries caster wheel 6. Caster wheel 6 can swivel about a vertical axis extending through caster hub 24 coaxial with vertical pivot stem 28. Caster wheel 6 also rotates about a substantially horizontal axis as it rolls along the ground by virtue of a horizontal axle 32 extending between the ears 31 of support yoke 30. Caster wheel 6 is rotatably carried on axle 32.

Figure 5:
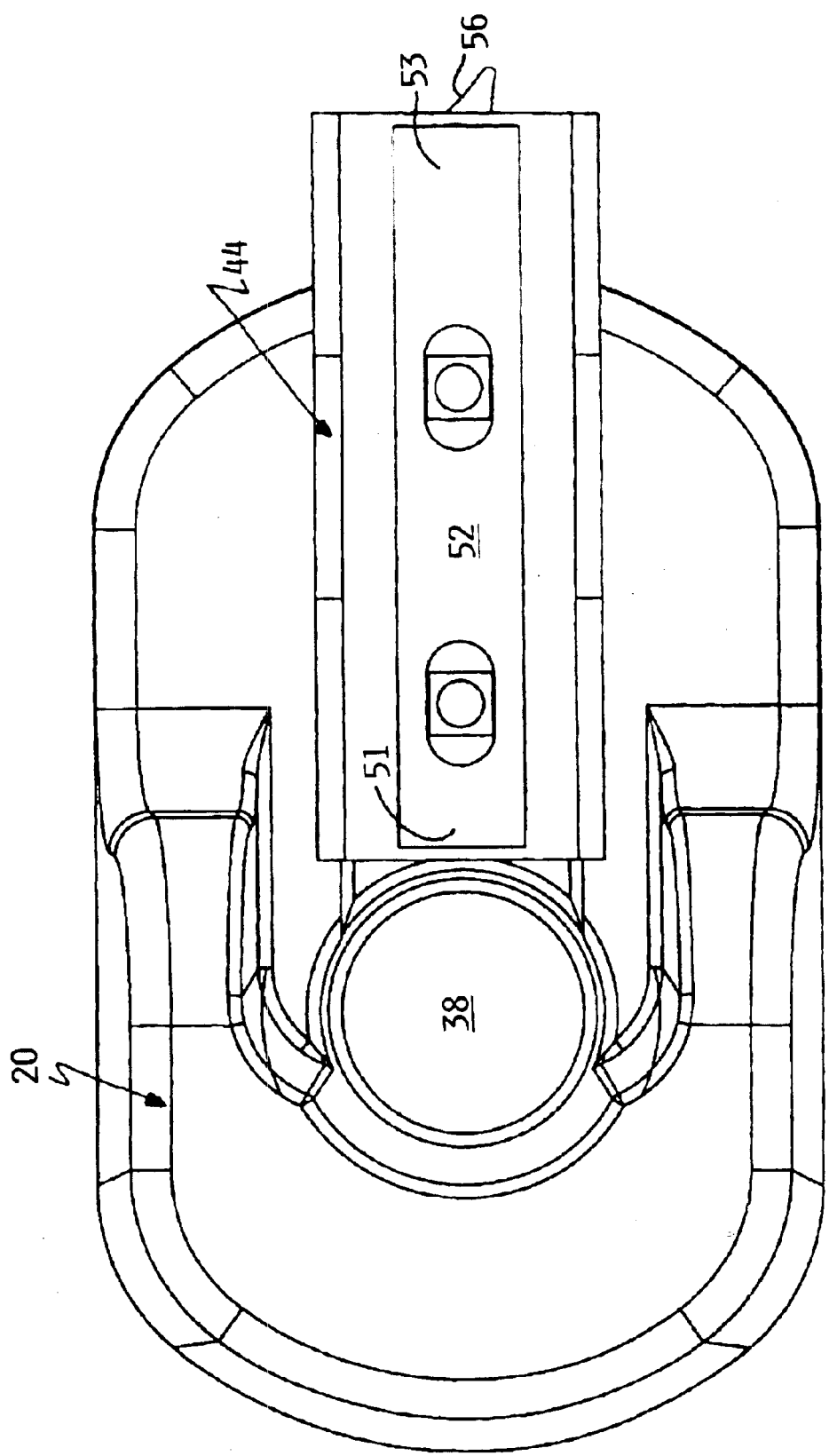
FIG. 5 is a bottom plan view of one of the counterweights of FIG. 1.

As shown in FIGS. 5 and 6, each counterweight 20 has an underside provided with a downwardly facing cavity 38 that receives or captures the upper portion of the caster hub 24 for a caster wheel 6. The upper end of caster hub 24 fits within cavity 38 when counterweight 20 is dropped down over caster wheel 6. When this occurs, the interaction between caster hub 24 and cavity 38 restrains both side-to-side and fore-and-aft motion of counterweight 20 relative to caster wheel 6. However, caster wheel 6 can still function in its normal manner, with the vertical pivot stem 28 of caster wheel 6 pivoting within caster hub 24 without interference from any portion of counterweight 20.

A lock 40 is provided to keep counterweight 20 secured to traction frame 4 such that counterweight 20 does not get bumped or jostled off caster wheel 6. While the interaction between the top of caster hub 24 and cavity 38 restrains sliding motion of counterweight 20, such interaction is not by itself sufficient to keep counterweight 20 attached to mower 2 as mower 2 traverses over uneven terrain. A positive lock 40 is preferred for accomplishing this function.

One embodiment of a counterweight lock 40 is a clamp 42 that clamps to front outrigger 8 that mounts caster wheel 6. Clamp 42 comprises a U-shaped downwardly facing channel 44 rigidly fixed to counterweight 20 in any suitable manner. Channel 44 is located at the rear of counterweight 20 behind cavity 38. Channel 44 is sized to fit down over front outrigger 8.

Channel 44 includes spaced lateral ears 46 which are long enough to extend down past front outrigger 8 when channel is received on front outrigger 8. Each ear 46 includes a hole 48. Holes 48 in the respective ears 46 are aligned with one another to allow a clevis pin 50 to be inserted through the aligned holes 48.

The top of channel 44 includes a deflectable clamping plate 52 that is secured only at its front end 51 in a cantilever manner to the front of channel 44. Thus, the rear end 53 of clamping plate 52 can elastically deflect up and down in the manner of a diving board. A threaded rod 54 passes down through the rear of channel 44 and abuts against the top of rear end 53 of clamping plate 52. A knob 56 is located on top of threaded rod 54 to allow the user to move rod 54 up and down by rotating rod 54.

Figure 3:
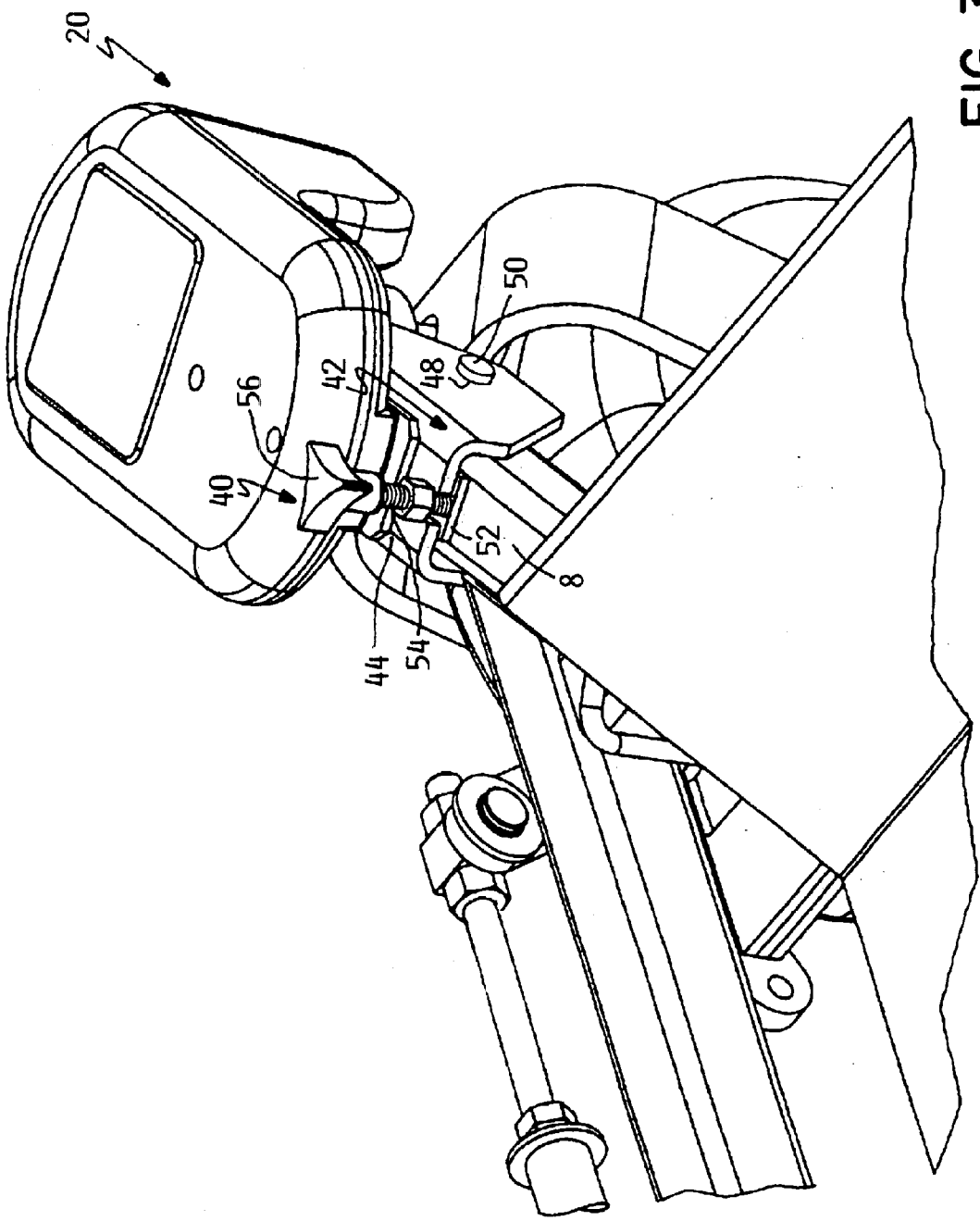
FIG. 3 is an enlarged perspective view of one of the counterweights of FIG. 1 installed over a caster wheel, particularly illustrating the clamp on the counterweight for clamping to the front outrigger supporting the caster wheel.
Figure 4:
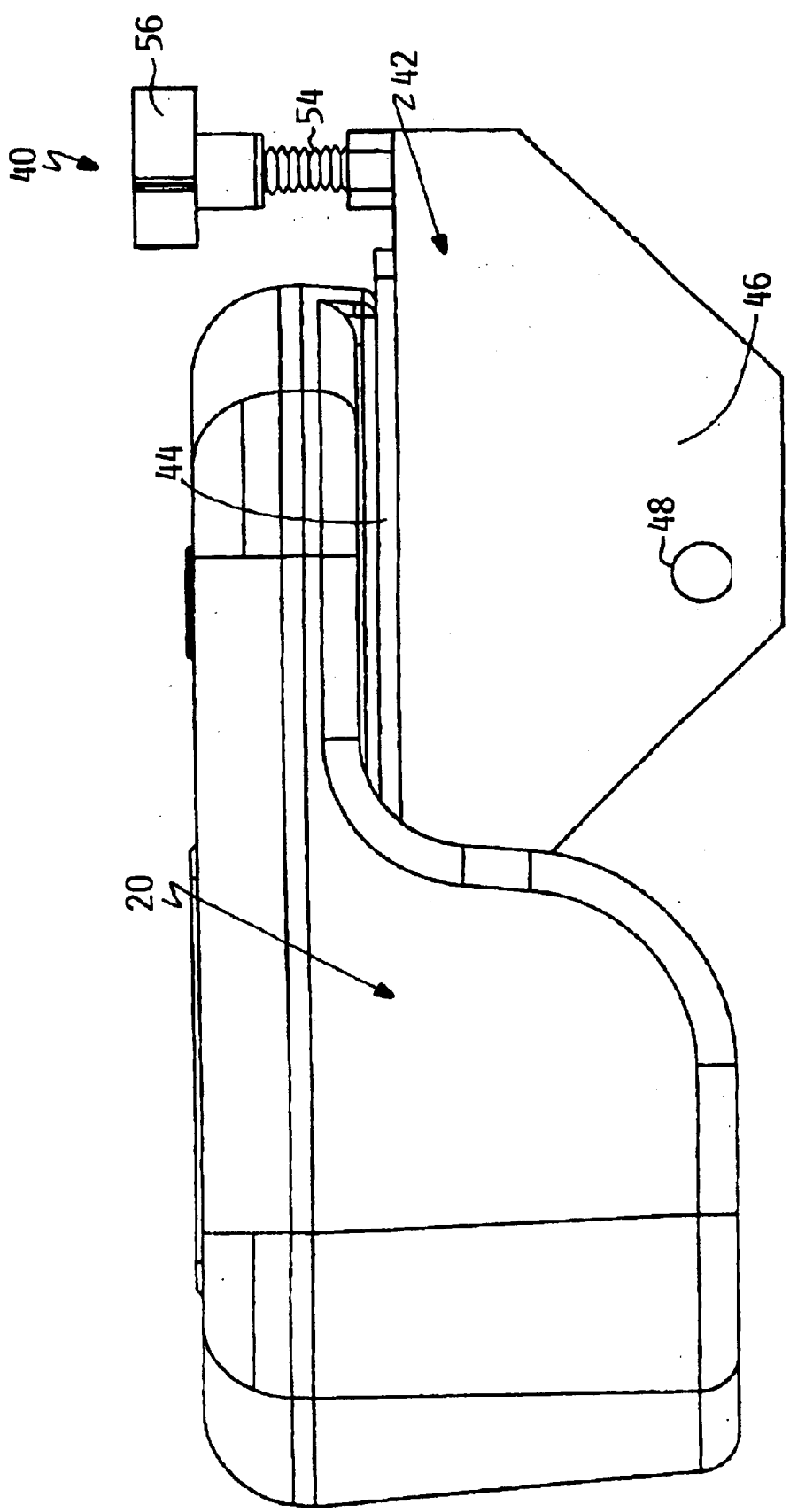
FIG. 4 is a side elevational view of one of the counterweights of FIG. 1.

To install counterweight 20 over a caster wheel 6, counterweight 20 is simply slipped down over caster wheel 6 until the top of caster hub 24 is received in cavity 38 and channel 44 is received over front outrigger 8. A clevis pin is inserted through aligned holes 48 in the ears 46 of channel 44 and is secured therein by any appropriate manner, e.g. by cotter pins or the like on each end of pin 50 or by nuts on threaded ends of pin 50. After pin 50 is so installed, the user than simply rotates knob 56 to rotate threaded rod 54 to begin deflecting clamping plate 52 downwardly into engagement with the top of front outrigger 8. When clamping plate 52 is tightened firmly into engagement with the top of front outrigger 8 as shown in FIG. 3, counterweight 20 will be locked in place relative to outrigger by being clamped between clevis pin 50 and clamping plate 52.

The use of a clamp 42 provided by the elastically deflectable clamping plate 52 could be deleted if so desired with just clevis pin 50 being used to retain counterweight on front outrigger 8. However, in this case, the manufacturing tolerances must be more closely controlled so that clevis pin 50 abuts against the underside of front outrigger when the bottom of channel 44 abuts against the top of front outrigger 8. By using a deflectable clamping plate 52, manufacturing tolerances need not be as closely controlled. The deflection of clamping plate 52 can take up any space or play that exists between the underside of front outrigger 8 and clevis pin 50.

Other types of clamps could be used in place of the elastically deflectable clamping plate 52 and clevis pin 50 arrangement that is shown herein. In addition, locks 40 other than clamps could be used to retain counterweight 20 to traction frame 4. For example, a lock acting between counterweight 20 and the exterior of the top of caster hub could be used, such as set screws or the like which are threaded into engagement with the exterior of the top of caster hub 24 or into threaded holes in the exterior of the top of caster hub 24. In this case, the rearwardly extending U-shaped channel 44, clamping plate 52, and clevis pin would not be used at all. Thus, while clamp 42 as shown herein is one particular type of lock 40 for retaining counterweight 20 in place, this invention is not limited to this type of clamp 42 or to a clamp at all.

Counterweights 20 of this invention can be easily installed and removed without the need for any type of mounting bar or other hardware added to traction frame 4 of mower 2. Whenever the balance of mower 2 is disturbed when using a rear mounted accessory, such as a rear mounted grass catching assembly, counterweights 20 of this invention can easily be installed simply by dropping them down over caster wheels 6 and by tightening clamps 42 to keep them in place. When the need for counterweights 20 is over, as when the rear mounted accessory is removed from mower 2, clamping plates 52 can be loosened, clevis pins 50 removed, and counterweights 20 simply lifted off caster wheels 6. With counterweights 20 removed, there is no mounting structure, such as a mounting bar, that is permanently left on traction frame 4 of mower 2.

Another advantage of counterweights 20 of this invention is that mounting them over caster wheels 6 places them as far forwardly as possible on mower 2. Thus, the amount of weight required in each counterweight to balance a particular rear mounted accessory is reduced from that which would be required if counterweights 20 were mounted further rearwardly.

Various modifications of this invention are apparent to those skilled in the art. For example, a lawn mower is not the only type of outdoor power equipment unit with which counterweights 20 of this invention can be used. Counterweights of this invention can be used with any type of outdoor power equipment unit that includes caster wheels 6. Moreover, counterweights 20 could be used with rear caster wheels as well as front caster wheels when one desires to add weight to the rear of an outdoor power equipment unit. Finally, while counterweights 20 desirably fit over caster wheels 6, counterweights 20 could also be clamped to outriggers behind caster wheels 6. While such a placement is not quite as effective for weight counterbalancing purposes as placing counterweights 20 over caster wheels 6, counterweights could still be installed and removed from traction frame 4 without using a separate weight mounting bar or other weight mounting hardware.

Accordingly, this invention is to be limited only by the appended claims.

We claim:

1. A removable counterweight for a lawn mower having a frame that carries a rotary cutting deck on a front of the frame, the frame including at least one elongated front outrigger that extends forwardly and that terminates in a free forward end located in advance of a front side of the rotary cutting deck, the front outrigger carrying at least one rotatable caster wheel adjacent the free forward end of the front outrigger such that the caster wheel is also located in advance of the front side of the rotary cutting deck, wherein the caster wheel is free to rotate about a substantially horizontal axis and is also free to simultaneously swivel about a generally vertical axis, which comprises:
a counterweight configured to be carried on the front outrigger and not on the caster wheel such that the counterweight does not rotate or swivel with the caster wheel but remains in place on the frame, wherein the counterweight lies on top of the free forward end of the front outrigger to overlie and cover the free forward end of the front outrigger with the counterweight being located substantially directly above and over the caster wheel and not being laterally displaced from the caster wheel when the counterweight is in use on the free forward end of the front outrigger.

2. The removable counterweight of claim 1, further including a lock for securing the counterweight to the front outrigger to prevent the counterweight from being disengaged from the frame during operation of the lawn mower.

3. The removable counterweight of claim 2, wherein the lock comprises a clamp for clamping against a portion of the front outrigger.

4. The removable counterweight of claim 3, wherein the clamp comprises a deflectable clamping plate that clamps against one side of the front outrigger.

5. The removable counterweight of claim 4 wherein the clamping plate clamps against a top surface of the front outrigger.

6. The removable counterweight of claim 5, wherein the clamp further comprises a pin for abutting against an underside of the front outrigger, the deflectable clamping plate being tightened against the top surface of the front outrigger to clamp the front outrigger between the clamping plate and the pin.

7. The removable counterweight of claim 4, further including a selectively rotatable threaded rod for deflecting the clamping plate.

8. The removable counterweight of claim 7, further including a knob attached to the rod which knob is sized to be gripped and turned by hand for manually rotating the rod.

9. A removable counterweight for an outdoor power equipment unit having an elongated outrigger with a generally horizontal top surface and downwardly extending side surfaces, a vertically extending, cylindrical caster hub carried on the outrigger with the caster hub having a protruding upper end extending above the top surface of the outrigger and a lower end that receives a pivot stem of a support that rotatably mounts a ground engaging caster wheel for rotation of the caster wheel about a substantially horizontal axis, wherein the caster wheel is supported for swiveling about a vertical axis by rotation of the pivot stem of the support within the caster hub carried on the outrigger, which comprises:
a counterweight having a downwardly facing substantially U-shaped channel formed by a top wall and downardly depending side walls, wherein the channel is sized to fit over the outrigger with the top wall of the channel lying on top of the top surface of the outrigger and with each of the side walls of the channel being located adjacent and outside of one of the side surfaces of the outrigger to mount the counterweight on the structural frame member, and wherein the counterweight further includes a cylindrical cavity which is sized to receive the protruding upper end of the caster hub when the channel of the counterweight is received on the outrigger.

10. The removable counterweight of claim 9, wherein the outrigger is a front outrigger of the outdoor power equipment unit and the caster wheel is a front caster wheel.

11. An outdoor power equipment unit, which comprises:
a traction frame supported for movement over the ground by a plurality of ground engaging wheels including a pair of front caster wheels carried on a pair of front outriggers;
a rotary cutting deck carried on the traction frame beneath the front outriggers for mowing grass with the front caster wheels being located ahead of the rotary cutting deck; and a pair of counterweights on the traction frame with each counterweight resting by gravity on top of one of the front outriggers and being located substantially directly above and over one of the front caster wheels without being laterally displaced from the front caster wheel, wherein the counterweights have clamps that clamp against the front outriggers on the traction frame to positively lock the counterweights to the front outriggers.

12. An outdoor power equipment unit, which comprises:

a traction frame supported for movement over the ground by a plurality of ground engaging wheels including a pair of rear drive wheels and a pair of front caster wheels, wherein the traction frame includes a pair of laterally spaced, forwardly extending, tubular front outriggers, and wherein each front outrigger journals each caster wheel such that the caster wheel is free to swivel relative to the front outrigger about a substantially vertical axis;

an implement carried on the traction frame for performing a ground or turf grooming or working operation; and a pair of counterweights on the traction frame, wherein each counterweight is carried on a front outrigger, and wherein each counterweight includes a downwardly facing, U-shaped channel that is configured to drop down onto and fit directly around the tubular front outrigger to thereby attach the counterweight to the front outrigger without using a weight mounting bar or bracket attached to the front outrigger.

13. The outdoor power equipment unit of claim 12, wherein each counterweight is located far enough forwardly on the front outrigger to be positioned directly above and over the caster wheel.

14. The outdoor power equipment unit of claim 12, further including a lock on each counterweight for securing the counterweight to the front outrigger.

* * * * *